Oct. 17, 1967     E. R. SNOOZY     3,347,564
CONSTANT LEVEL ADJUSTABLE TRACTOR HITCH
Filed Sept. 13, 1965     2 Sheets-Sheet 1

INVENTOR.
Edward R. Snoozy
BY
Sam J. Slotsky
ATTORNEY

Oct. 17, 1967   E. R. SNOOZY   3,347,564
CONSTANT LEVEL ADJUSTABLE TRACTOR HITCH
Filed Sept. 13, 1965   2 Sheets-Sheet 2

INVENTOR.
Edward R. Snoozy
BY
Sam J. Slotsky
ATTORNEY

United States Patent Office 3,347,564
Patented Oct. 17, 1967

3,347,564
CONSTANT LEVEL ADJUSTABLE TRACTOR
HITCH
Edward R. Snoozy, Dell Rapids, S. Dak. 57022
Filed Sept. 13, 1965, Ser. No. 486,858
5 Claims. (Cl. 280—479)

A tractor hitch including a parallelogram linkage which keeps the hitching device at a constant angle relative to the ground surface, and includes a transversably slidable releasing hitch means.

My invention relates to a tractor hitch.

An object of my invention is to provide a tractor hitch which will remain in a true horizontal position regardless of the angle of the supporting elements which support the hitch.

A further object of my invention is to provide a hitch which is positive in operation, and which is laterally adjustable.

A further object of my invention is to provide certain other advantages which will be apparent from the description herein.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1:
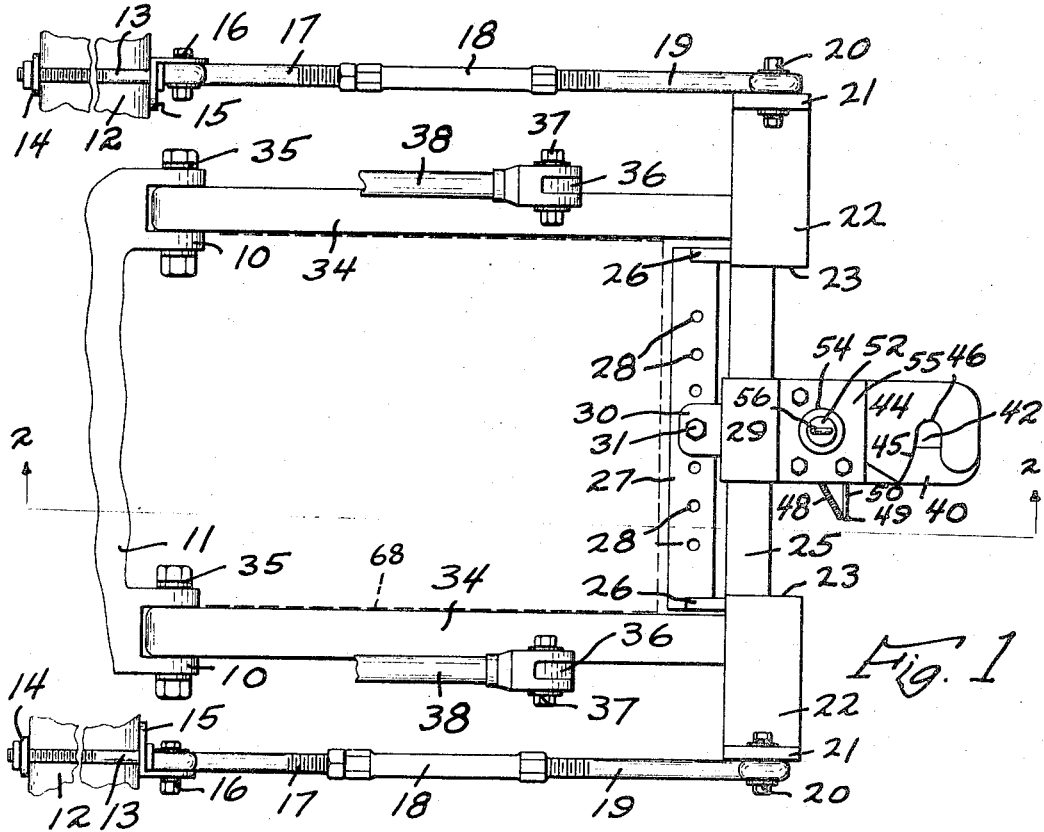
FIGURE 1 is a plan view of the hitch.

My invention contemplates the provision of a hitch which can be hitched onto a vehicle to be drawn by a tractor for instance, and wherein the hitch is readily attached to a hitch pin, and wherein the hitch structure itself or the latch device of the hitch will constantly be in a horizontal position at all times so that regardless if the hitch is on the ground level or at a substantially raised elevation, the latch portions of the hitch will remain constantly horizontal to provide a positive engagement of the coupled parts.

In describing my invention I have used the character 10 to designate standard ears or lugs which form a portion of the rear of the tractor itself, such rear portion being indicated by the character 11, and I have further used the character 12 to designate the rear axle housing portions of the tractor.

Secured to the axle 12 by means of the bolts and nuts 13, straps 14 and angle members 15 are the brackets thus formed to which are pivotally secured at 16 the rods 17 which threadably engage the turn buckles 18 which in turn threadably engage the further rods 19 which are suitably pivoted at 20 to the vertically positioned bar portions 21 which extend into the horizontal portions 22 which in turn extend into the further vertical portions 23 which are suitably welded as at 24 to a transverse square-in-section tube 25.

Attached to the tube 25 are the brackets 26 which are secured to a transverse strap 27 having a series of spaced openings 28 therein.

The character 29 indicates a further square-in-section tube portion which fairly snugly receives the tube 25 and attached to the member 29 are the ears 30 carrying the bolt 31. Received within the square-in-section tube 25 is the round shaft or bar 32 which is securely welded at 33 to the ends of the further arms 34. The arms 34 are pivotally attached as at 35 to the lugs 10, and attached to the arms 34 are the bars or posts 36 to which are pivotally attached at 37 the standard lift bars 38 which pass ot the usual power source of the tractor itself and which arms 38 can be raised or lower as desired.

Figure 2:
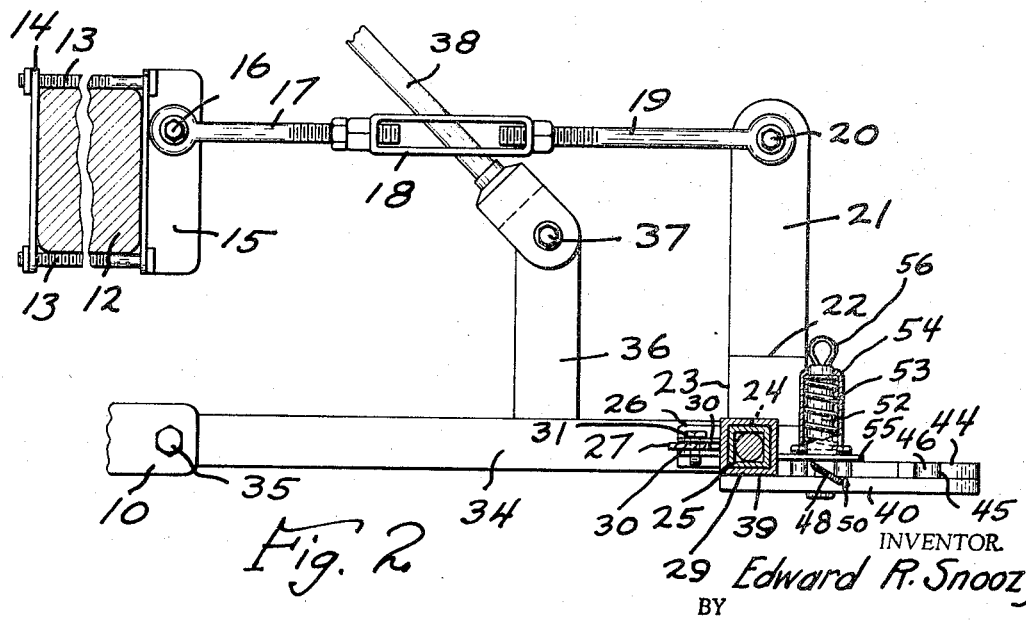
FIGURE 2 is a sectional view of FIGURE 1 taken substantially along the lines 2—2 thereof.
Figure 3:
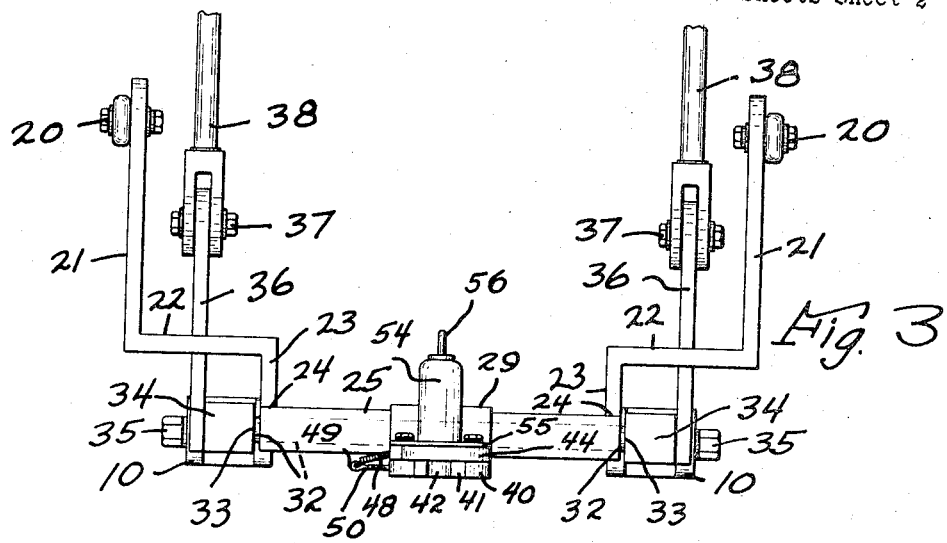
FIGURE 3 is a rear view of the hitch.

Welded as at 39 to the tube 29 (see FIGURE 2) is a rearwardly extending member 40 having the cutaway portions 41 terminating in the opening 42, and pivoted at 43 to the member 40 is a latch member 44 having the cutaway portion 45 terminating in the opening 46.

Attached to the member 44 at 47 is a spring 48 which is attached at 49 to the rod 50 which is attached to the member 40. The character 51 indicates a stop pin attached to the member 40, and the character 52 indicates a spring-urged pin received in the spring 53 which is contained within the housing 54 which is attached to the top plate 55 which covers the latch element 44.

The hitch operates in the following maner. It will be observed from FIGURE 2 especially that a parallelogram having equal horizontal arms as well as vertical arms is provided by means of the members 17, 18, 19, and 34, as well as the members 21 etc. and the vertical distances between the points 16 and 35. As a result any movement of the lift members 38 either downwardly or upwardly will have the tendency of maintaining the bars or arms 21 etc. in a constantly true vertical position, therefore maintaining the square-in-section members 25 and 29 in a constant horizontal position, as well as the hitch or latch members 40, 44, etc. This will be true even if the hitch latch member is at ground level or at any elevated position, and in this manner when the engagement is made with a hitch pin on the towed vehicle, the engagement of the hitch pin in the opening 42 will be positive without the operator being concerned with any angular positioning of the hitch elements.

Figure 4:
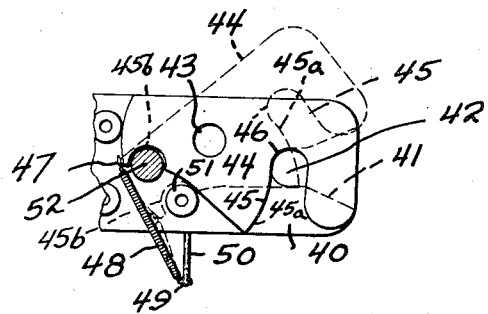
FIGURE 4 is a plan view of the latch device itself with the top plate removed.

The operation of the latching mechanism is as follows. Before the latching bolt or pin is placed in position, the square-in-section member 29 can be placed in any desired lateral position by merely placing the bolt 31 in any one of the openings 28 closest to the latching pin or bolt, to thereby provide an adjustable lateral positioning as desired, and to open the latch member 44 the pin 52 is pulled upwardly by means of any suitable cable passing to the tractor and tied to the member 56 which is attached to the pin 52, the spring 48 then pulling the latch 44 to the open position shown by the dotted line in FIGURE 4, and then the tractor is backed to engage the hitch pin which will then pass into the opening 42. As the pin travels into the opening 42 it will strike against the surface at 45a and the latch 44 will then close to the solid line position shown in FIGURE 4. The pin 52 will then be released so that it will engage the portion 45b of the latch whereupon the latch member will then securely hold the hitch pin.

The combination of the lateral adjustment together with the constantly horizontal hitch member provides for a quick and convenient attachment without requiring extra manipulation at the latch itself.

Figure 5:
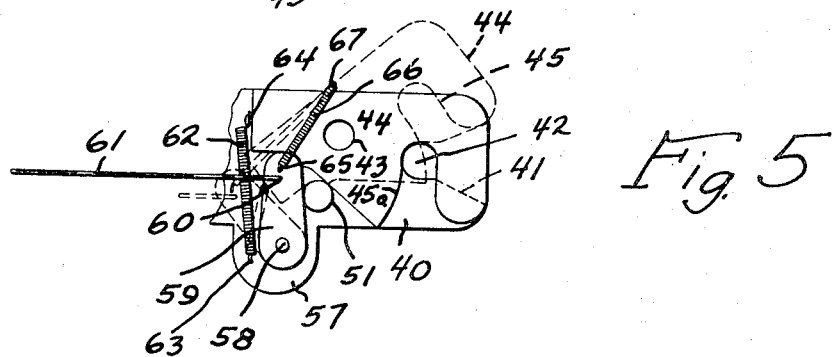
FIGURE 5 is a modification of the latch device.

FIGURE 5 illustrates a further slight modification of the latch mechanism with identical characters indicating identical parts, however in this modification, an extension 57 is formed with the portion 40 to which is pivoted at 58 a short lever 59 which is attached at 60 to a suitable cable 61, the character 62 indicating a spring attached at 63 and to the member 44 at 64 to provide a similar action as the spring 48, and attached at 65 to the member 59 is a further spring 66 which is attached at 67 to the member 40; pulling on the cable 61 providing a similar effect to the spring-urged pin 52.

The character 68 indicates by dotted lines a portion of the extending structure of the tractor which is received between the bars 34 which assists in maintaining lateral stabilization to the unit. The turnbuckles 18 permit for adjustments if desired.

It will now be noted that I have provided the advantages mentioned in the objects of my invention with further advantages being apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A tractor hitch comprising a pair of laterally spaced support arms, means for raising and lowering said support arms, means for pivotally mounting the inner ends of said support arms to a tractor, further arms positioned above said support arms and parallel thereto, means for pivotally mounting the inner ends of said further arms to said tractor, linking means pivotally attached to the outer ends of said support arms and to said further arms forming a parallelogram linkage with said arms, a transverse shaft secured to the outer ends of said support arms, a hitch member mounted on said transverse shaft, a substantially square-in-section tube receiving said shaft and fixed to said linking means, a further square-in-section tube receiving said square-in-section tube, said hitch member being attached to said further square-in-section tube.

2. A tractor hitch comprising a pair of laterally spaced support arms, means for raising and lowering said support arms, means for pivotally mounting the inner ends of said support arms to a tractor, further arms positioned above said support arms and parallel thereto, means for pivotally mounting the inner ends of said further arms to said tractor, linking means pivotally attached to the outer ends of said support arms and to said further arms, forming a parallelogram linkage with said arms, a transverse shaft secured to the outer ends of said support arms, a hitch member mounted on said transverse shaft, a substantially square-in-section tube receiving said shaft and fixed to said linking means, a further square-in-section tube receiving said square-in-section tube, said hitch member being attached to said further square-in-section tube, means for adjustably positioning said further square-in-section tube laterally along said square-in-section tube.

3. A tractor hitch comprising a pair of laterally spaced support arms, means for raising and lowering said support arms, means for pivotally mounting the inner ends of said support arms to a tractor, further arms positioned above said support arms and parallel thereto, means for pivotally mounting the inner ends of said further arms to said tractor, linking means pivotally attached to the outer ends of said support arms and to said further arms forming a parallelogram linkage with said arms, a transverse shaft secured to the outer ends of said support arms, a hitch member mounted on said transverse shaft, a substantially square-in-section tube receiving said shaft and fixed to said linking means, a further square-in-section tube receiving said square-in-section tube, said hitch member being attached to said further square-in-section tube, means for adjustably positioning said further square-in-section tube laterally along said square-in-section tube, said hitch member having a cavity for receiving a hitching pin, a spring-urged latch member pivoted to said hitch member adapted to lock said pin to said hitch member.

4. A tractor hitch comprising a pair of laterally spaced support arms, means for raising and lowering said support arms, means for pivotally mounting the inner ends of said support arms to a tractor, further arms positioned above said support arms and parallel thereto, means for pivotally mounting the inner ends of said further arms to said tractor, linking means pivotally attached to the outer ends of said support arms and to said further arms forming a parallelogram linkage with said arms, a transverse shaft secured to the outer ends of said support arms, a hitch member mounted on said transverse shaft, a substantially square-in-section tube receiving said shaft and fixed to said linking means, a further square-in-section tube receiving said square-in-section tube, said hitch member being attached to said further square-in-section tube, means for adjustably positioning said further square-in-section tube laterally along said square-in-section tube, said hitch member having a cavity for receiving a hitching pin, a spring-urged latch member pivoted to said hitch member adapted to lock said pin to said hitch member, said latch member including a base portion, a latch element pivoted to said base portion, a spring-urged pin normally engaging said latch element, spring means for closing said latch element when said pin is released from said latch element.

5. A tractor hitch comprising a pair of laterally spaced support arms, means for raising and lowering said support arms, means for pivotally mounting the inner ends of said support arms to a tractor, further arms positioned above said support arms and parallel thereto, means for pivotally mounting the inner ends of said further arms to said tractor, linking means pivotally attached to the outer ends of said support arms and to said further arms forming a parallelogram linkage with said arms, a transverse shaft secured to the outer ends of saids upport arms, a hitch member mounted on said transverse shaft, a substantially square-in-section tube receiving said shaft and fixed to said linking means, a further square-in-section tube receiving said square-in-section tube, said hitch member being attached to said further square-in-section tube, means for adjustably positioning said further square-in-section tube laterally along said square-in-section tube, said hitch member having a cavity for receiving a hitching pin, a spring-urged latch member pivoted to said hitch member adapted to lock said pin to said hitch member, said latch member including a base portion, a spring-urged latch element pivoted to said base portion, a spring-urged lever member engaging said latch element, movement of said lever member being adapted to close said latch element.

References Cited

UNITED STATES PATENTS

| 3,060,696 | 10/1962 | Lang | 172—484 X |
| 3,266,817 | 8/1966 | Engstrom | 172—275 X |

FOREIGN PATENTS

| 234,013 | 5/1960 | Australia. |
| 869,020 | 10/1941 | France. |
| 948,845 | 9/1956 | Germany. |

LEO FRIAGLIA, *Primary Examiner.*